July 18, 1944.   J. D. BUCHANAN   2,353,874
METALWORKING APPARATUS
Filed Nov. 18, 1940   2 Sheets-Sheet 1
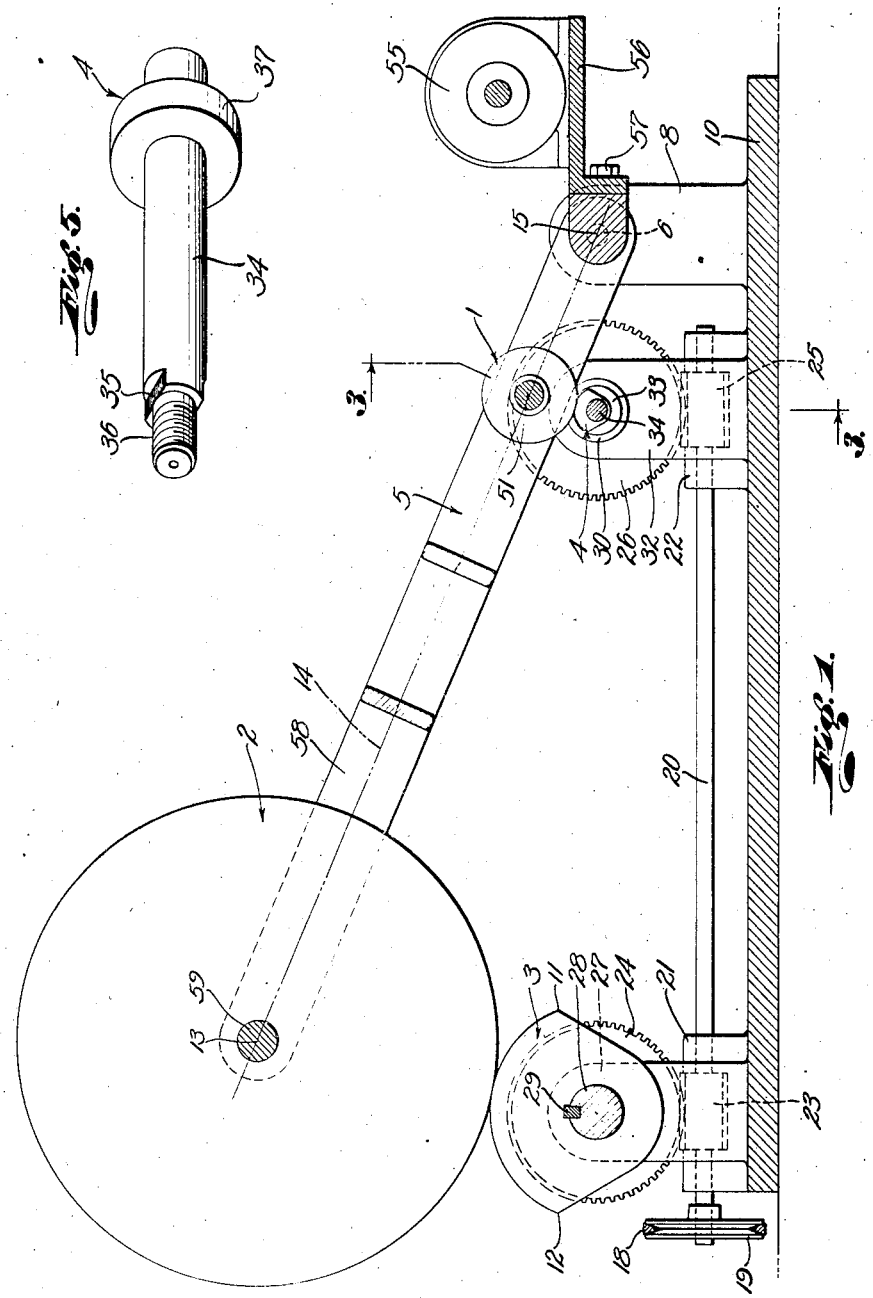
Inventor
J. D. Buchanan
By W. H. Beatty
Attorney July 18, 1944.  J. D. BUCHANAN  2,353,874
METALWORKING APPARATUS
Filed Nov. 18, 1940  2 Sheets-Sheet 2
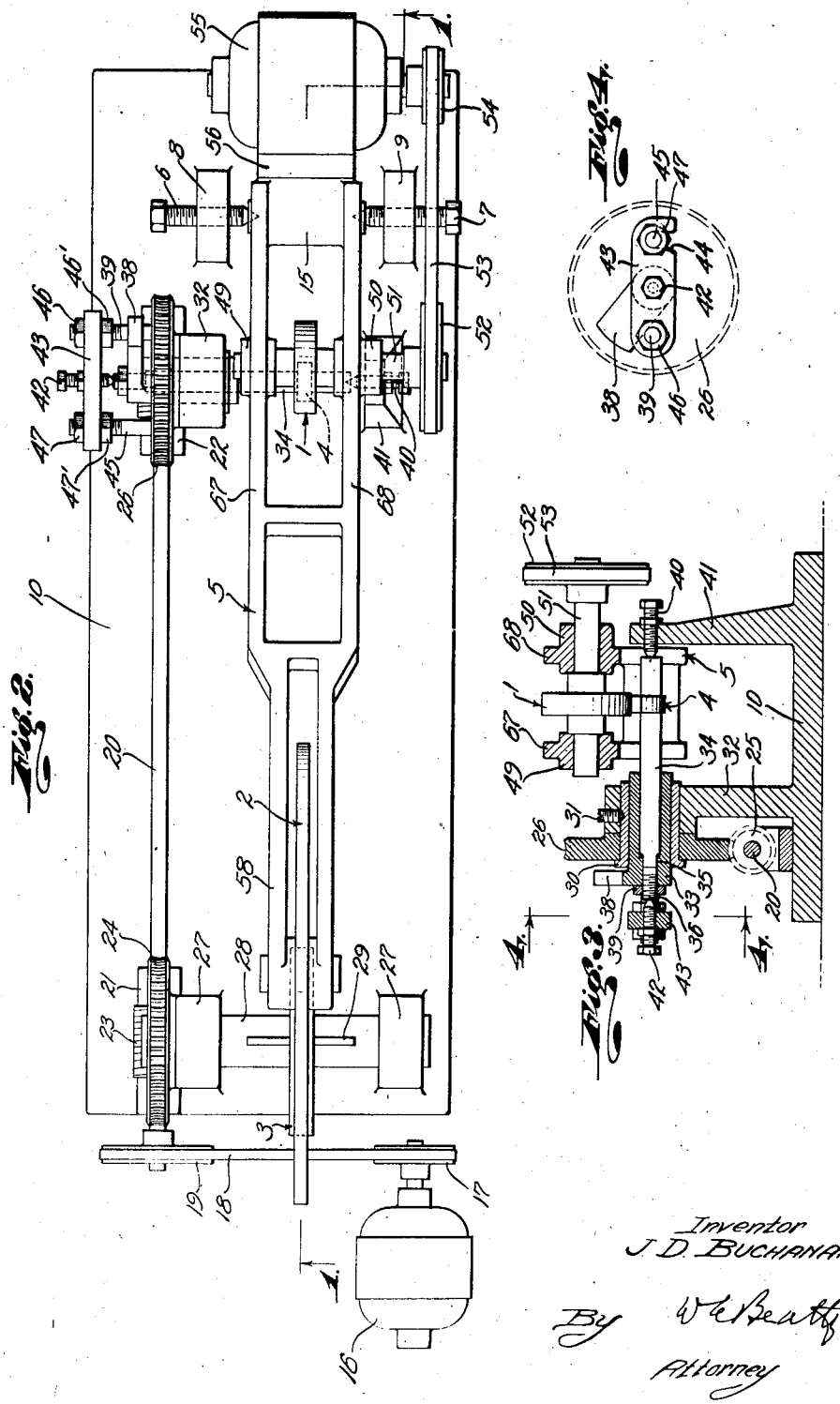
Inventor
J. D. Buchanan
By W. E. Beatty
Attorney Patented July 18, 1944

2,353,874

UNITED STATES PATENT OFFICE 2,353,874

METALWORKING APPARATUS

J. D. Buchanan, Burbank, Calif.

Application November 18, 1940, Serial No. 366,027

7 Claims. (Cl. 90—13.7)

The invention relates to metal working apparatus wherein a tool is moved by a follower acting on a pattern, to cause the tool to operate on a work piece and machine it like the pattern. The invention has for an object to machine the work piece like the pattern with great precision, even though the pattern has a discontinuous contour.

Although it is possible to machine a work piece with a discontinuous contour by means of an end mill and a dividing head, such work is laborious and time consuming. Also it has been proposed to mount a follower and a cutter on a swinging arm as shown in the patent to Lecomte 1,389,835, but here the tool and the follower travel in different arcs at right angles to the common axis of the work piece and pattern, so that the movement of the tool is not strictly proportional to the contour of the pattern, and this lack of proportionality is aggravated at places of sharp discontinuity in the contour of the pattern.

An object of the invention is to machine a work piece different in size from but strictly proportional to a pattern, even though the pattern has a discontinuous contour, and to effect this in a continuous operation by a machine.

A further object is to provide a machine for maintaining strict proportionality between the position of the tool and the contour of the pattern, for all positions of the follower.

A further object of the invention is to improve the accessibility, removability and adjustability of the component parts of such a machine.

For further details of the invention, reference may be made to the drawings wherein:

Fig. 1 is a vertical sectional view on line 1—1 of Fig. 2, of a machine according to the present invention.

Fig. 2 is a plan view of the machine of Fig. 1.

Fig. 3 is a vertical sectional view on line 3—3 of Fig. 1.

Fig. 4 is an end elevation of the work piece holder of Fig. 2.

Fig. 5 is a perspective view of a typical blank work piece to be tooled by the machine of this invention.

Referring in detail to the drawings, the radial tool (cutter or grinder 1), which is moved under control of the follower 2 acting on the pattern 3, is to fashion or machine the work piece 4 to precisely the same shape as the pattern 3, but on a smaller scale.

The pattern 3 and the work piece 4 are rotated in synchronism at a slow speed such as one revolution per minute, while the tool 1 is driven at a high speed; viz. 250 lineal feet per minute.

The rotary tool 1 and the follower 2 are mounted on a swinging arm 5 which is pivotally supported by the adjustable pivot pins 6 and 7 mounted in standards 8 and 9 respectively arising from the base 10.

The pivotal axis 15 of the arm 5, which is determined by the pins 6 and 7, together with the four axes of rotation of tool 1, follower 2, pattern 3 and work piece 4, are all parallel to each other.

The pattern 3 is shown as having a contour which is discontinuous as represented by the points 11 and 12, that is the contour of pattern 3 changes abruptly at these points. If the follower 2 were substantially a point instead of being a large disk as herein illustrated and if the various parts were not properly correlated as herein provided, the point follower on reaching a place of discontinuity in the pattern 3 would drop the tool 1 too fast to make a faithful copy of the pattern. The invention provides that the cutter shall be raised and lowered at the proper instant of time with respect to the rotation of the pattern 3 and work piece 4 by arranging the center 13 of follower 2 on a straight line 14 which passes through the axis of tool 1 and through the axis 15 of the pivot pins 6 and 7, and by giving the radius of follower 2 a value such that it bears to the radius of tool 1 the same ratio that the distance from center 13 to pivot axis 15 bears to the distance from the axis of tool 1 to pivot axis 15. A straight line through the axis 15 and tangent to the periphery of the tool 1, will also be tangent to the periphery of the follower 2. However, the working points of the tool 1 and the follower 2 may vary from their points of tangency depending upon the contour of the pattern 3. I also arrange the pivot axis 15 and the axes of pattern 3 and work piece 4 on a straight line. Also, the axis of work piece 4 and the axis of tool 1 are at the same distance from pivot 15, and the axis of pattern 3 and the axis 13 of follower 2 are at the same distance from pivot 15. Hence two similar isosceles triangles are formed, having a common apex at the pivot axis 15, one of them having two equal sides from the pivot axis 15 to the axis of tool 1 and from the pivot axis 15 to the axis of workpiece 4, assuming a base line to be constructed from the axis of tool 1 to the axis of workpiece 4, and the other triangle having the two equal sides from axis 15 to the axis 13 and from axis 15 to the axis of pattern 3, assuming a base line from axis 13 to the axis of pattern 3. Also, these two triangles remain similar isosceles triangles for all working positions of the swinging arm 5.

This means that as the arm 5 swings up and down, with the follower 2 in contact with the pattern 3, the distance between axis 13 and the axis of pattern 3 always bears to the distance between the axis of tool 1 and the axis of work piece 4, the same ratio as the corresponding sides of their respective triangles; namely, the distance from axis 13 to 15 to the distance from the axis of tool 1 to the axis 15, the last mentioned ratio being the same as the ratio of the radius of pattern 3, taken to the point where the follower 2 contacts the pattern 3, to the radius of work piece 4, taken to the point where tool 1 contacts it.

Motor 16, having pulley 17, is coupled by belt 18 to the pulley 19 mounted on shaft 20 supported by bearings 21 and 22 from the base 10. Shaft 20 carries a worm gear 23 coupled to worm wheel 24 and also worm gear 25 coupled to worm wheel 26. Worm wheel 24 is supported by bearing 27 and is mounted on a shaft 28 to which the pattern 3 is fastened by means of key 29.

Worm wheel 26, as shown in Fig. 3, is rotatably mounted on a fixed sleeve 30 secured by pin 31 at the top of standard 32 which arises from the base 10. Inside of sleeve 30 is a hollow sleeve adapter 33 to receive the work piece 4. Work piece 4 as shown in Fig. 5, is here shown as comprising a shaft 34 having a non-circular or flat portion 35 terminating in a threaded end 36. Shaft 34 has integral therewith, a blank disk 37 which is to be cut in the shape of a cam or valve lifter to correspond with the shape of the pattern 3 as shown in Fig. 1.

The bore of adapter 33 is made non-circular to interfit with the flat 35 so that the work piece 4 will turn with adapter 33, the latter having an arm 38 as shown in Fig. 4 which is contacted by a bolt 39 mounted on and turning with the gear 26. The threaded end 36 of the work piece 4 projects beyond the end of adapter 33 and on this projecting end I provide a nut 39 to clamp the work piece 4 to the end of adapter 33. The work piece 4 is centered by means of an adjustable centering pin 40 mounted in the standard 41 arising from base 10 at one end of work piece 4, and by an adjustable centering of pin 42 at the other end of work piece 4. Pin 42 is mounted in a latch or swinging arm 43 which is pivotally mounted on the bolt 39, the other end of arm 43 having a latch or cut away portion 44 to ride over and engage a similar bolt 45 also mounted on gear 26. The arm 43 is held in position on the bolts 39 and 45 by means of nuts 46 and 46', on bolt 39, and 47, 47' on bolt 45.

As shown in Figs. 2 and 3, the swinging arm 5 has sides 67 and 68 spaced apart and forming bearings 49 and 50 for the shaft 51 of a radial cutter 1. On shaft 51 is mounted a pulley 52 coupled by belt 53 to the pulley 54 of a motor 55 which is mounted on an arm 56 secured to arm 5 by bolts like 57. As the motor 55 is on the opposite side of the pivot axis 15 from the arm 5 and its parts, the motor 55 acts as a counter-balance for arm 5. The circular disk follower 2 is rotatably mounted on the bifurcated end 58 of the arm 5.

As the arm 5 is supported by the center pins 6 and 7, these pins may be adjusted to vary the transverse position of the arm 5 and the tool 1 and follower 2 thereon.

The work piece 4 may be axially shifted by means of the center pins 40 and 42. Also, the work piece 4 may be removed from the machine by backing off the screw 42, by loosening nuts 46 and 47 and swinging the arm 43 upwardly to laterally move the pin 42 out of the way, and by pulling the adapter 33 and the work piece 4 carried thereby axially out of the sleeve 30, the latter having a diameter larger than the work piece 4. This provides a simple way for substituting a new blank work piece after the preceding one has been finished.

Follower 2 is removably mounted on a pin or shaft 59 and another follower slightly larger or smaller than the one calculated as above, may be used to compensate for wear of the tool 1 or for wear of other parts of the machine, or to compensate for slight inaccuracies in locating the axes of the tool 1, follower 2, pattern 3 and work piece 4 with respect to the pivot 15.

As the follower 2 rests by gravity on the pattern 3, and as the pattern 3 and workpiece 4 are rotated in synchronism at a slow speed such as one revolution per minute, while the tool 1 is driven at a high speed such as 250 lineal feet per minute, as above stated, it follows that the blank workpiece 4 as shown in Fig. 5, is provided with a finished cut which is the counter-part of the pattern 3 when the pattern 3 and workpiece 4 have made but one revolution.

The effective length of the follower 2 is of course the length of the line from its point of contact with pattern 3 to the axis 13, or expressed differently, from its point of contact with pattern 3 to the point where the axis of follower 2 intersects the straight line 14. Likewise, the effective length of the cutter 1 is the length of the line from its contact with the work piece 4 to the point where the axis of tool 1 intersects line 14.

Various modifications may be made in the invention without departing from the spirit of the claims. For example, the pattern may have any desired contour other than that shown, and in fact, its contour may be continuous instead of discontinuous.

I claim:

1. Metal working machine comprising the combination of a drive shaft, a pair of spaced worm gears thereon, a worm wheel for each of said gears, means supporting each of said gears for rotation on substantially parallel axes, a pattern coupled to one of said gears, a fixed sleeve rotatably supporting the other of said gears, a workpiece holder fitting said sleeve, and means removably securing said holder to said other gear, and follower means for tooling the work piece in accordance with said pattern.

2. Metal working machine comprising the combination of a drive shaft, a pair of spaced worm gears thereon, a worm wheel for each of said gears, means supporting each of said gears for rotation on substantially parallel axes, a pattern coupled to one of said gears, a fixed sleeve rotatably supporting the other of said gears, a work piece holder fitting said sleeve, means removably securing said holder to said other gear, means for removably securing in said holder one end of a work piece smaller in diameter than the inside diameter of said sleeve, means spaced from said gear for rotatably supporting the other end of the work piece, a rotatable tool, a movable support therefor adapted to move the tool to contact the work piece between said work holder and said means for supporting the other end of the work piece, and follower means for moving said tool support in accordance with said pattern.

3. Metal working apparatus comprising the combination of a pair of worm gears, means supporting said gears for rotation on parallel axes, a common drive shaft and worms thereon for said gears, a pattern coupled to one of said gears, a fixed sleeve supporting the other of said gears, said sleeve having a bore larger than a work piece having a shaft with an intermediate raised portion to be tooled, means at one end of said sleeve for securing one end of the work piece axially of said sleeve with the raised portion of the work piece projecting beyond the other end of said sleeve, and tooling means controlled by said pattern for tooling the raised portion of the work piece.

4. Metal working machine comprising the combination of a drive shaft, a pair of spaced worm gears thereon, a worm wheel for each of said gears, means supporting each of said gears for rotation on substantially parallel axes, a pattern coupled to one of said gears, a fixed sleeve rotatably supporting the other of said gears, a workpiece holder fitting said sleeve, means for removably securing one end portion of the workpiece in said holder coaxially of said sleeve, spaced means for rotatably supporting the opposite end portion of the workpiece, means removably securing said holder to said other gear, and follower means for tooling the workpiece in accordance with said pattern.

5. Metal working machine comprising the combination of a drive shaft, a pair of spaced worm gears thereon, a worm wheel for each of said gears, means supporting each of said gears for rotation on substantially parallel axes, a pattern coupled to one of said gears, a fixed sleeve rotatably supporting the other of said gears, a workpiece holder fitting said sleeve, means for removably securing one end portion of the workpiece in a said holder coaxially of said sleeve, spaced means for rotatably supporting the opposite end portion of the workpiece, means removably securing said holder to said other gear, and follower means comprising a tool holder supporting a tool for rotation on an axis parallel to the axis of said sleeve for tooling the workpiece in accordance with said pattern.

6. Metal working machine comprising the combination of a base, a drive shaft on said base, a pair of spaced worm gears on said shaft, a worm wheel for each of said gears, means supporting each of said gears on said base for rotation on substantially parallel axes, a pivot on said base, a pattern coupled to one of said gears remote from said pivot, a fixed sleeve rotatably supporting the other of said gears adjacent said pivot, a workpiece holder fitting said sleeve, a cooperating workpiece support on said base, means removably securing said holder to said other gear, an arm pivotally connected to said pivot, a circular follower at the outer end of said arm arranged to rest on said pattern, and a tool holder on said arm for supporting a tool for the workpiece, said tool holder comprising means for supporting a tool for rotation on an axis parallel to a line through the centers of said sleeve and said workpiece support.

7. A metal working machine comprising the combination of relatively movable supports, a pivot therefor permitting movement of one of said supports about a common axis, one of said supports supporting a rotatable pattern and a rotatable work piece holder on the same side of said pivot, said pattern and said work piece holder being mounted for rotation on centers lying on a straight line through said pivot, a follower for said pattern and a tool for said work piece holder arranged on the other of said supports on centers lying on another straight line through said pivot, said follower being adapted to rest on said pattern and said tool being adapted to rest on a work piece, the point of intersection of the axis of the tool with said second line and the center of the work holder being at the same distance from said pivot, the point of intersection of the axis of the follower with said second line and the center of said pattern being at the same distance from said pivot, one of said distances being greater than the other, the ratio of the effective length of said follower to the effective length of said tool being the same as the ratio of the distances of their respective said points of intersection from said pivot, the point where said follower is adapted to contact the pattern, and the point where said tool is adapted to finish the work piece, lying on a straight line through said pivot, whereby said tool when guided by said follower contacting said pattern is adapted to traverse the contour thereof to reproduce the same by said ratio.

J. D. BUCHANAN.